United States Patent [19]

Kelbel

[11] 4,185,723

[45] Jan. 29, 1980

[54] AUTOMATIC FOUR-WHEEL DRIVE TRANSFER CASE

[75] Inventor: Donald W. Kelbel, Muncie, Ind.

[73] Assignee: Borg-Warner Corporation, Chicago, Ill.

[21] Appl. No.: 903,429

[22] Filed: May 8, 1978

Related U.S. Application Data

[63] Continuation of Ser. No. 750,048, Dec. 13, 1976, abandoned.

[51] Int. Cl.² .................... F16D 41/10; F16D 47/04
[52] U.S. Cl. .................................. 192/36; 180/247; 192/44; 192/48.92
[58] Field of Search ............... 192/35, 36, 44, 48.92; 180/44 R, 49

[56] References Cited

U.S. PATENT DOCUMENTS

| | | | |
|---|---|---|---|
| 1,273,952 | 7/1918 | Tibbetts | 192/48.92 X |
| 2,699,852 | 1/1955 | Cost | 192/46 |
| 2,796,941 | 6/1957 | Hill | 180/44 R |
| 3,221,574 | 12/1965 | Sampietro et al. | 74/665 |
| 3,295,625 | 1/1967 | Ordorica et al. | 180/44 R |
| 3,300,002 | 1/1967 | Roper | 192/35 |
| 3,481,436 | 12/1969 | Wilkowski | 192/35 |
| 3,854,561 | 12/1974 | Conde | 192/48.92 |
| 3,993,152 | 11/1976 | Fogelberg | 180/44 R |

FOREIGN PATENT DOCUMENTS 899607  8/1944  France ..................................... 192/44

Primary Examiner—Allan D. Herrmann
Attorney, Agent, or Firm—Julian Schachner

[57] ABSTRACT

A power transfer mechanism incorporated in a multiple path drive system comprises a transfer case disposed between a source of input torque and a pair of drive axles. Torque is transferred directly to the fixed axle and, when required, is transferred automatically to the steering axle through a double-acting overrunning clutch. A friction clutch provides a preset constant friction drive through a separate path in parallel with the overrunning clutch for independent torque transfer from the steering axle to the fixed axle.

9 Claims, 6 Drawing Figures

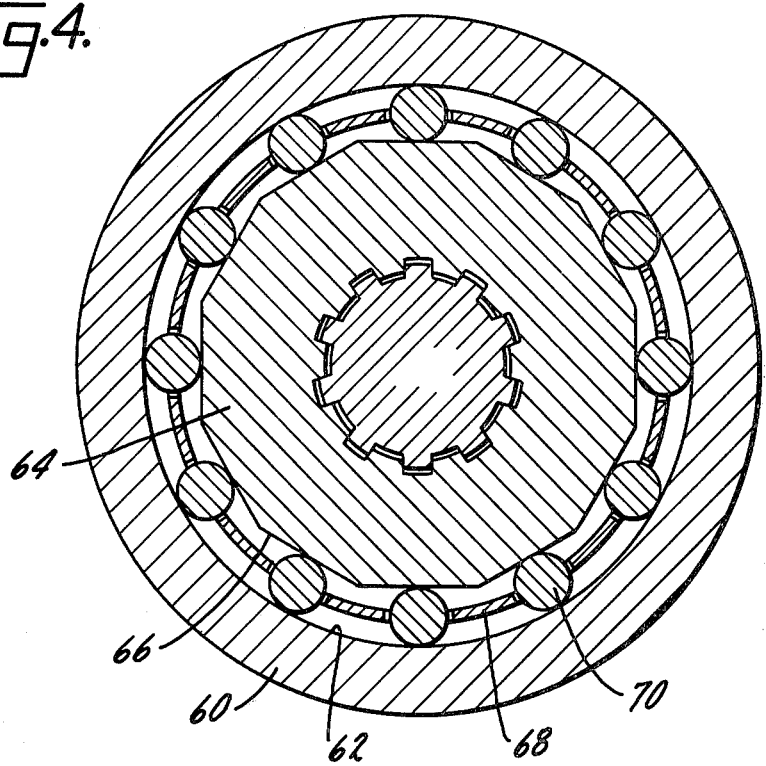
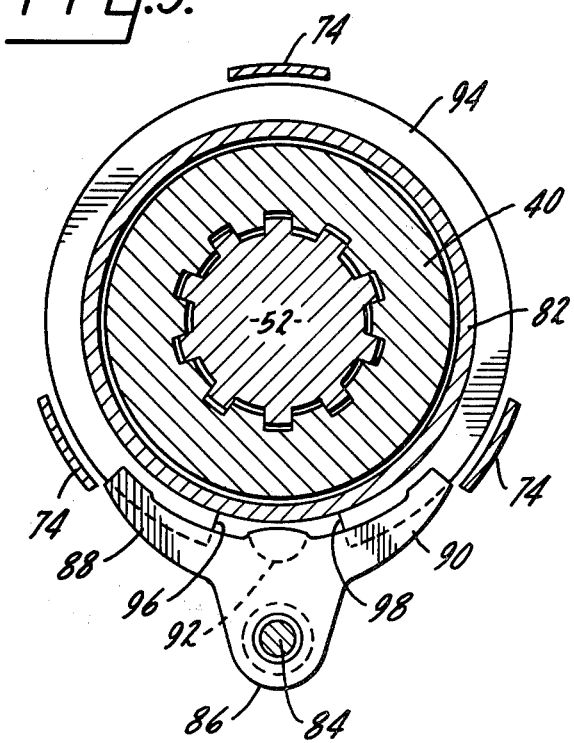
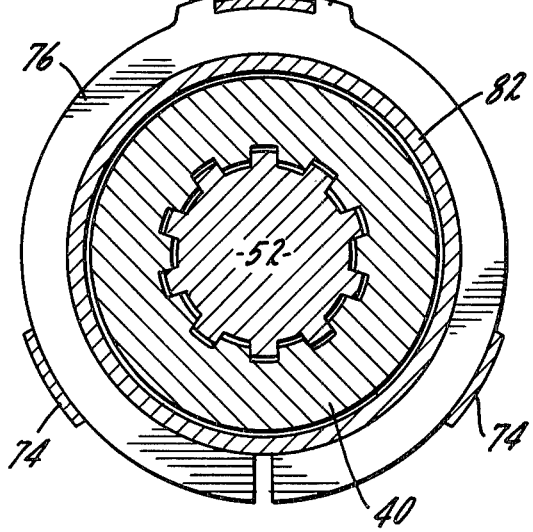

AUTOMATIC FOUR-WHEEL DRIVE TRANSFER CASE

This is a continuation of application Ser. No. 750,048 filed Dec. 13, 1976 now abandoned.

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle when two-wheel drive is adequate and to provide torque for both drive axles automatically when four-wheel drive is required. The torque transfer case incorporates a double-acting overrunning clutch for automatically engaging and disengaging the four-wheel drive function.

In recent years there have been many improvements in automotive drive trains, including improvements relating to the transfer of torque from a prime mover to drive axles. Where four-wheel drive systems are used, transfer cases have been developed which direct torque to one output to drive a fixed axle and through an overrunning clutch to another output for driving a steering axle. One such transfer case is disclosed in U.S. Pat. No. 3,993,152 issued Nov. 23, 1976, wherein an overrunning clutch automatically engages and disengages the four-wheel drive function. However, under certain conditions undesirable clutch lockup may occur, thus negating its automatic function. This problem now is believed to have been solved by the direction-sensitive blocking structure disclosed in U.S. application No. 716,629 filed Aug. 23, 1976.

Under certain operating conditions there is a tendency for the fixed axle wheel to skid, with consequent loss of vehicle control. As disclosed in U.S. Application No. 676,774 filed Apr. 14, 1976, this tendency may be corrected by providing sufficient drive back from the steering axle wheels to keep the fixed axle wheels rotating. A drive path is established between the axles by loosely connecting one clutch race element with the steering axle, and by providing frictional engagement between this element and the fixed axle. However, it is now known that such a drive path is not fully independent of the clutch and may interfere with clutch operation.

SUMMARY OF THE INVENTION

This invention is directed to an improved four-wheel drive system including a transfer case of the type having an overrunning clutch therein, which transfer case includes means to eliminate any of the aforementioned undesirable interference with operation of the clutch.

The transfer case is adaptable for transferring torque from an input directly to fixed (herein called rear) axle wheels and through the overrunning clutch to steering (herein called front) axle wheels. When the rear wheels lose traction in either direction of rotation, the overrunning clutch effectively engages and torque is transferred to both axles, thereby establishing a four-wheel drive condition. When traction is restored to the rear wheels, the overrunning clutch effectively disengages and the system reverts back to a two-wheel drive condition.

The transfer case includes a front output incorporating an outer clutch race of cylindrical configuration. A rear output incorporates an inner clutch race having a plurality of ramp surfaces, each associated with a roller carried by a roller cage. Frictional bias for the roller cage is provided by a drag ring rotatable with the roller cage and adapted for frictional engagement with the transfer case housing.

A drive path is provided from the front axle to the rear axle independently of the overrunning clutch. A friction clutch is disposed between the front and rear outputs for transferring torque back from front to rear. This establishes a drive path from the front wheels to the rear wheels in parallel with the overrunning clutch, but separate therefrom so as not to interfere with its operation. As a result there is a preset constant friction drive between the front and rear wheels, so as to overcome any tendency of the rear wheels to skid.

With a double-acting overrunning roller clutch incorporated in the system, it is desirable to guard against undesirable clutch engagement. This is accomplished by a direction-sensitive blocking device which prevents undesirable roller movement through the central or free-wheel position. The device is frictionally biased by a drag ring adapted for frictional engagement with the transfer case housing. Upon movement of the vehicle, a drag force is developed which causes an element of the device to pivot in the path of the roller cage, thereby preventing undesirable movement of the cage and its associated rollers across the central position. The relationship of the element and drag ring is such that there is lost motion therebetween. In the event torque is applied during direction reversals with the vehicle stopped, this relationship insures that the cage and its associated rollers are in their proper position, thus preventing undesirable clutch engagement. The device is direction-sensitive and operates in either direction of rotation, without regard to the speed of rotation.

Thus, the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 4 is a sectional view taken along the line 4—4 of FIG. 3 showing additional details of the double-acting overrunning clutch;

FIG. 5 is a sectional view taken along the line 5—5 of FIG. 3 showing details of the blocking structure; and FIG. 6 is a sectional view taken along the line 6—6 of FIG. 3 showing details of the biasing structure.

Figure 1:
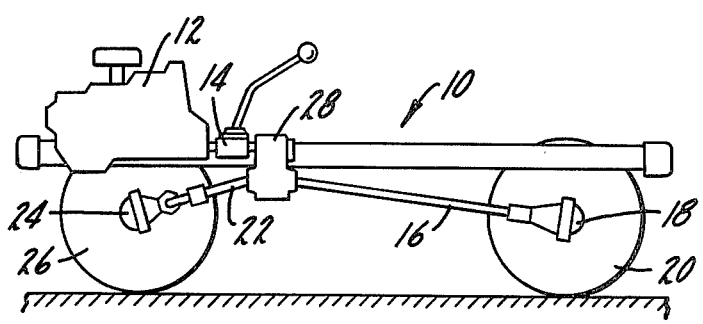
FIG. 1 is a schematic view of the four-wheel drive vehicle.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally in FIG. 1 a multiple path drive system in the form of a four-wheel drive vehicle 10 having a prime mover 12 in driving relationship with a suitable transmission 14. A propeller shaft 16 is in driving engagement with a fixed axle assembly 18, which in turn supports a pair of ground-engaging wheels 20. Another propeller shaft 22 is in driving engagement with a steering axle assembly 24, which in turn supports a pair of ground-engaging wheels 26. A torque transfer case 28 is in engagement with transmission 14 for receiving torque from prime mover 12, and is in engagement with propeller shafts 16 and 22 respectively for transmitting torque to ground-engaging wheels 20 and 26.

Figure 2:
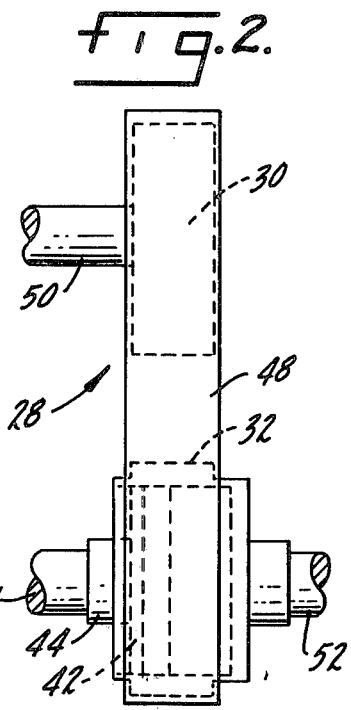
FIG. 2 is a schematic view of the torque transfer case.
Figure 3:
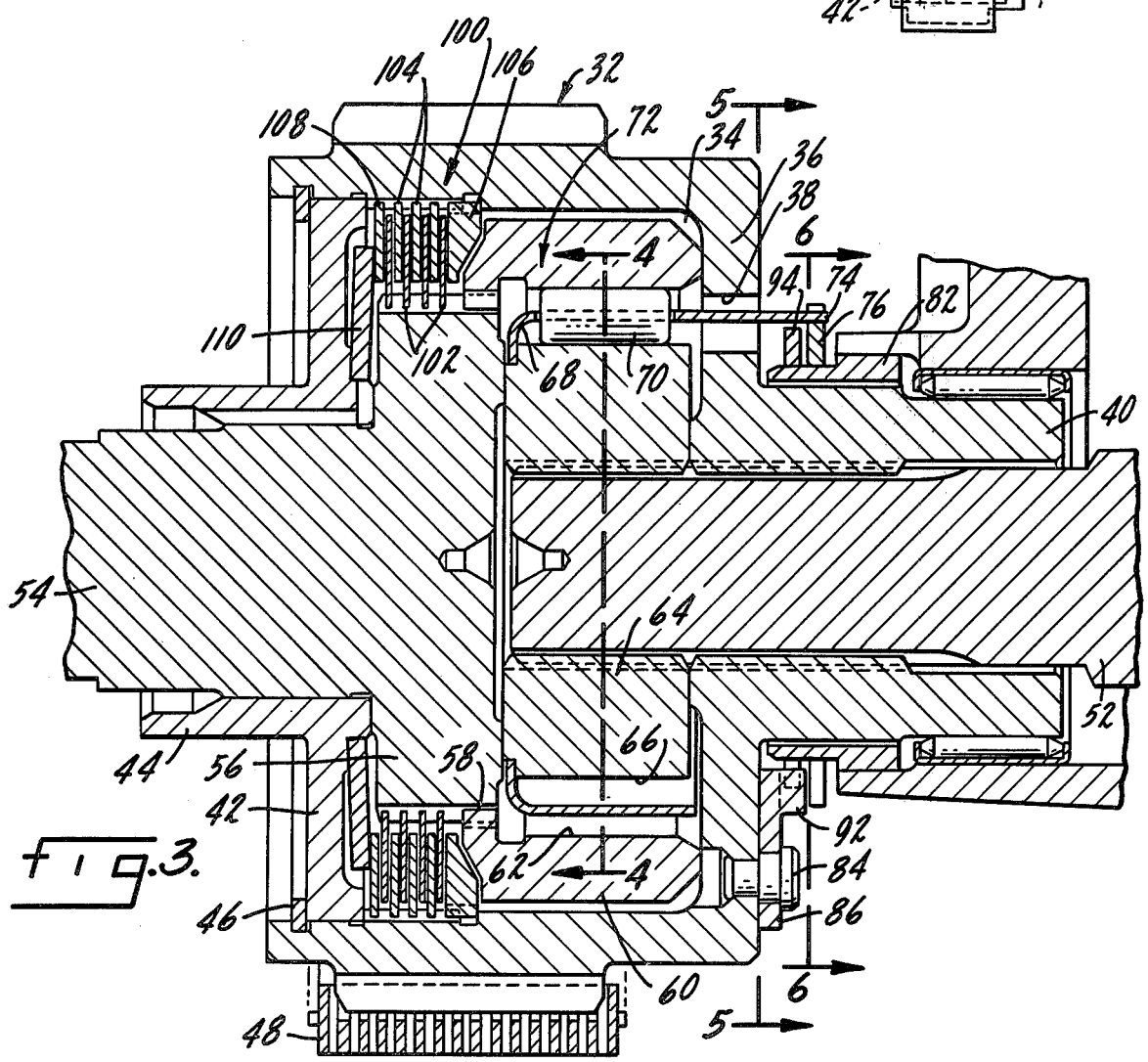
FIG. 3 is a sectional view showing details of the double-acting overrunning clutch and the friction clutch incorporated in the torque transfer case.

As shown in FIGS. 2, 3 and 4, transfer case 28 includes a first sprocket 30 and a second sprocket 32. Sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. A suitable chain 48 couples sprockets 30 and 32. Sprocket 30, chain 48 and sprocket 32 form a chain drive train.

An input shaft 50 extends into transfer case 28 and is engaged with sprocket 30. Input shaft 50 is adapted to receive torque, for example, from associated manual or automatic transmission 14 of automotive vehicle 10. It should be understood that input shaft 50 may be the output shaft of such a transmission.

A rear output shaft 52 is engaged with propeller shaft 16 and extends into transfer case 28. As disclosed in the aforementioned U.S. Pat. No. 3,993,152, output shaft 52 may be engaged with sprocket 30 to provide straight through drive from input shaft 50 to propeller shaft 16, or may be engaged with sprocket 32 to provide offset drive from input shaft 50 to propeller shaft 16. In the embodiment shown herein, output shaft 52 is splined to extension 40 of sprocket 32.

A front output shaft 54 engaged with propeller shaft 22 and extends into transfer case 28. Output shaft 54 defines an upstanding flange 56 which is engaged by means of a loose spline connection 58 with an annular extension 60 within pocket 34 of sprocket 32. Extension 60 defines an outer clutch race 62 of cylindrical configuration.

An annular element or cam 64 is splined to output shaft 52. Cam 64 is within pocket 34 and defines an inner clutch race 66 comprising a plurality of flats or ramp surfaces.

An annular cage 68 supports a plurality of wedging elements 70, one of which is associated with each flat of inner race 66. Extension 60, cam 64, races 62 and 66, cage 68 and wedging elements 70 comprise together a double-acting overrunning clutch or freewheel device 72. In one preferred form of the invention, wedging elements 70 are rollers, and clutch 72 is a roller clutch.

As shown in FIGS. 3 and 6, roller cage 68 defines a plurality of fingers 74 extending through openings 38 of sprocket 32. Fingers 74 are in frictional contact with a drag ring 76. Drag ring 76 defines a pair of spaced projections 78 and 80 for engagement by a finger 74 such that drag ring 76 is rotated with fingers 74 as roller cage 68 rotates. A wear ring 82 is press fit to the housing of transfer case 28 for frictional contact by drag ring 76, so as to establish smooth frictional engagement therewith. As a result, balanced radial forces are developed with cause a relative drag effect on roller cage 68.

Turning now to FIGS. 3 and 5, the direction-sensitive blocking mechanism includes a pin 84 secured to flange 36 of sprocket 32, and a rocker element 86 pivotally supported by pin 84. Element 86 includes a pair of arms 88 and 90 and a projection 92. A drag ring 94 is in frictional contact with wear ring 82, so as to establish smooth frictional engagement with the housing of transfer case 28. Drag ring 94 is spaced from fingers 74 of roller cage 68.

As disclosed in the aforementioned U.S. application No. 716,629, drag ring 94 is cut away adjacent projection 92 of element 86, thereby defining spaced ends 96 and 98. In one preferred form of the invention, ends 96 and 98 form a gap of approximately 30 to 40 degrees in drag ring 94 adjacent projection 92. In effect, this develops a lost motion connection between projection 92 and drag ring 94.

A drive-back mechanism is shown in FIG. 3 in the form of a friction clutch 100 interposed between flange 56 of output shaft 54 and sprocket 32. Friction clutch 100 includes one or more interleaved friction discs 102 and 104 respectively splined to flange 56 and sprocket 32. A reaction member 106 is secured to sprocket 32 and is formed so as to be spaced slightly from extension 60. A pressure plate 108 is splined to sprocket 32. A Belleville spring 110 between flange 42 and pressure plate 108 applies an axially directed biasing force tending to urge friction discs 102 into contact with friction discs 104. This results in the establishment of a friction drive path between output shafts 52 and 54, which drive path is in parallel with but separate from the drive path established through clutch 72.

In operation, torque is received by input shaft 50 and is transferred directly to output shaft 52. Output shaft 52 is connected through propeller shaft 16 to drive fixed rear axle assembly 18 and its associated wheels 20. Output shaft 54 is connected through propeller shaft 22 to drive steerable front axle assembly 24 and its associated wheels 26.

The aforementioned U.S. application No. 676,774 teaches that extension 60 need not overrun cam 64 in order for clutch 72 to be effective, as clutch 72 is a freewheel device. It should be understood, however, that in one preferred form of the invention overrun may be built into clutch 72. Where output shaft 52 is engaged with sprocket 30, overrun may be built into the chain drive train and a stub shaft, for example, may connect extension 40 and cam 64. Where output shaft 52 is engaged with sprocket 32, as shown in FIGS. 2 and 3, this may be accomplished by having slightly different axle ratios, front wheels slightly smaller than rear wheels, or by inflating the front tires to a pressure slightly less than that in the rear tires. Other suitable means may be provided for causing extension 60 to overrun cam 64. In any event, extension 60 inherently rotates faster than cam 64 when the vehicle is turning, since the front wheels travel through a larger radius than do the rear wheels. Even when moving in a straight path there is a slight tendency of the vehicle to turn, for which the operator must compensate.

With reference to FIG. 4, assume output shaft 52 and cam 64 are rotating in the clockwise direction. Output shaft 54 and extension 60 also rotate in the clockwise direction, but tend to overrun. The drag effect on roller cage 68, developed by the frictional engagement of drag ring 76 with wear ring 82, causes rollers 70, in effect, to rotate relatively in the counterclockwise direction. Rollers 70 tend to wedge between inner race 66 and outer race 62 so as to engage clutch 72. However, due to the fact that extension 60 tends to overrun cam 64, a force is developed which acts on rollers 70 such that they will tend to be carried in the clockwise direction, relatively, away from their engaged position. This effectively prevents engagement of clutch 72. As a result, torque is transferred to output shaft 52 but not to output shaft 54. In this condition, the operation is essentially that of a conventional two-wheel drive vehicle.

When the rear wheels lose traction, output shaft 52 will speed up. The drag effect on roller cage 68 will cause rollers 70 effectively to wedge between inner race 66 and outer race 62. When this takes place, torque will be transferred both to output shaft 52 and through clutch 72 to output shaft 54. In this condition, the operation is essentially that of a conventional four-wheel drive vehicle in locked-up mode.

When the rear wheels regain traction, output shaft 52 will slow down, and output shaft 54 will again tend to overrun output shaft 52, thereby effectively disengaging clutch 72 and restoring the vehicle to the two-wheel drive condition. Thus, it will be seen that the transfer case provides for establishment of four-wheel drive automatically, as required, and for establishment of two-wheel drive automatically when four-wheel drive is not required. This automatic engaging and disengaging feature is provided when the vehicle is moving in either the forward or reverse directions; that is, when output shafts 52 and 54 are rotating in either the clockwise or counterclockwise directions as shown in FIG. 4.

Relative rotation between extension 60 and cam 64, with extension 60 overspeeding, prevents clutch 72 from engaging by causing rollers 70 to move slightly, relatively, away from a wedging position on clutch races 62 and 66. This results in slight rotational displacement of cage 68 toward the central position.

Excessive overspeed of extension 60 could pull cage 68 and rollers 70 beyond the central position into a clutch engaging position on the opposite side of cam 64. This may occur under unusual operating conditions. For example, a tire blowout would cause the rolling radius of that wheel to become suddenly reduced. Such changes in the characteristics of a vehicle driveline would create a potentially dangerous condition. Similarly, shocks due to jerks, bumps, etc. could cause instantaneous excessive overspeed sufficient to pull the rollers beyond the freewheel position to create the same potential danger. Centrifgual force effects on the rollers tend to pull them, and the cage, toward the opposite side of the cam. While enough friction on the cage to prevent this could be built into the system, the amount required would be wasteful of power and could lead to excessive wear under normal operating conditions. The direction-sensitive blocking mechanism prevents such inadvertent movement of rollers 70 at all speeds, as taught in the aforementioned U.S. Application No. 716,629.

The direction-sensitive blocking mechanism is operable independently of speed. Initial vehicle movement causes rotation of sprocket 32 to drive output shaft 52 and cam 64. Pin 84, secured to flange 36 of sprocket 32, rotates therewith and with cam 64. Element 86 is carried with pin 84. Drag ring 94, engaged with projection 92 by a lost motion connection, tends to lag pin 84 due to its frictional contact with wear ring 82. As a result, element 86 is picked up by end 96 or 98 of drag ring 94 and pivoted about pin 84, and either arm 88 or 90 is moved into the path of rotational displacement of fingers 74, depending on the direction of vehicle movement. In this position, fingers 74 have limited freedom of movement such that cage 68 and rollers 70 are movable between clutch engaging and disengaging positions, but are not movable beyond the central position toward the opposite clutch engaging position.

As taught in the aforementioned U.S. application No. 676,774, the drive-back mechanism overcomes undesirable characteristics found under certain operating conditions. When going downhill on loose terrain, such as gravel or the like, in low gear, there may be enough engine braking to overcome the friction between the tires and the ground surface. At such times, the rear wheels break away; that is, they lose rolling contact with the surface and go into a skid. The same thing could happen on a level road in the coast mode of operation on a slippery surface, such as ice or the like. On ice, it could happen in high gear. In other words, whenever there is developed greater engine braking than the rear wheels can absorb alone, they will skid with consequent loss of vehicle directional control. This result is more apparent in a vehicle with a manual transmission than in one with an automatic transmission having a fluid member. The problem may be solved by providing a drive path back from front to rear in order that the front wheels keep the rear wheels rolling in the coast mode of operation, so as to overcome any tendency of the rear wheels to skid.

Such a drive path is provided from output shaft 54 through friction clutch 100 and sprocket 32 to output shaft 52. Belleville spring 110 provides a preset biasing force tending to establish constant frictional engagement of clutch 100. It is desirable to control this closely so as to keep the amount of torque transferred back as low as possible and not introduce significant inefficiency into the system in the drive mode of operation. Thus, the biasing force of Belleville spring 110 should be light, and the number of friction discs 102 and 104 should be as few in number as is practical.

The torque transferred back through friction clutch 100 does not interfere with effective operation of overrunning clutch 72, as the torque transfer paths established by clutch 72 and 100 are independent of each other. This is true where output shaft 52 is engaged with either of sprockets 30 or 32.

It should be understood that while a preferred embodiment of the invention has been shown and described, this is illustrative and may be modified by those skilled in the art without departing from the scope thereof, which is to be limited only by the claims herein.

I claim:

1. A torque transfer assembly comprising an input shaft, first and second output shafts, means coupling said input shaft with said output shafts for transfer of torque thereto, said coupling means including an overrunning clutch having wedging means movable between two positions wherein torque is transferred to said second output shaft and an intermediate position wherein torque is not transferred to said second output shaft, means for biasing said wedging means toward one of said transferring positions, means operable upon rotation of one of said shafts for blocking said movement of said wedging means to the other of said transferring positions, and drive means coupling said output shafts for transfer of torque therebetween at a constant rate independently of said overrunning clutch.

2. The invention of claim 1, said last-mentioned means defining friction drive means.

3. The invention of claim 2, said friction drive means being a friction clutch.

4. In a four-wheel drive vehicle having a source of power, first and second axles each supporting a pair of ground-engaging wheels, and a transfer case for transferring rotary motion from said source of power to said wheels, said transfer case including an input member coupled with said source of power, first and second output members respectively coupled with said first and second axles, and means for transferring rotary motion from said input member to said output members, said transferring means coupling said input member with said first output member and including a freewheel device coupled with said second output member; the improvement comprising means for transferring rotary motion between said output members at a constant rate independently of said freewheel device.

5. The invention of claim 4, said last-mentioned means including first and second elements respectively in engagement with said first and second output members, and means biasing said first and second elements toward interengagement.

6. The invention of claim 5, said first and second elements being friction discs, and said biasing means being a spring biasing said friction discs toward frictional contact with each other.

7. Power transmission apparatus especially adapted for driving a motor vehicle having first and second ground-engaging wheels, said apparatus comprising a rotary input member adapted for connection to a source of power, and rotary output means adapted for connection to said ground-engaging wheels, said rotary output means including a pair of spaced primary rotary members coupled to each other for synchronous rotation and providing a driving connection for said first wheels and an auxiliary rotary member providing a driving connection for said second wheels, said auxiliary member being coupled to one of said primary members by a first clutch arranged to prevent overrunning of said one primary member relative to said auxiliary member, and a second clutch arranged to provide a constant force of predetermined magnitude tending to prevent underrunning of said one primary member with respect to said auxiliary member.

8. The invention of claim 7, said second clutch being a friction clutch arranged for transferring said force between said one primary member and said auxiliary member independently of said first clutch.

9. The invention of claim 8, resilient means biasing said friction clutch toward engagement, thereby determining the magnitude of said force.

* * * * *